July 12, 1932.   N. LOMBARD   1,866,858
CONTROL DEVICE FOR FLUID PRESSURE ACTUATED MECHANISM
Filed June 13, 1928   2 Sheets-Sheet 2

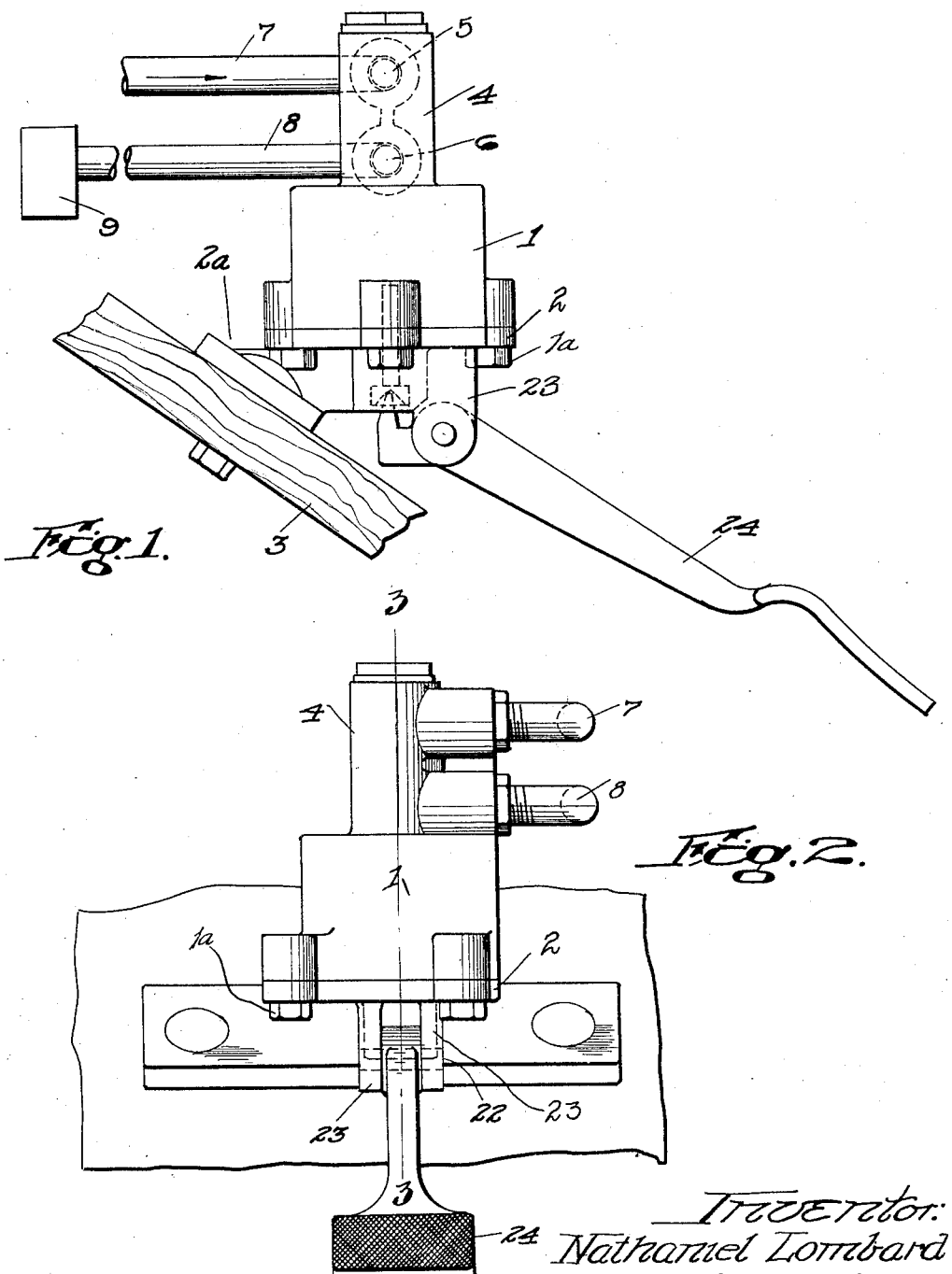

Inventor:
Nathaniel Lombard
by Owen W. Kennedy
attorney

Patented July 12, 1932

1,866,858

UNITED STATES PATENT OFFICE

NATHANIEL LOMBARD, OF WORCESTER, MASSACHUSETTS

CONTROL DEVICE FOR FLUID PRESSURE ACTUATED MECHANISM

Application filed June 13, 1928. Serial No. 285,013.

My invention relates to an improved device for controlling the operation of brakes or other mechanism that is actuated by fluid pressure such as the air or oil pressure brakes that are employed on trucks, busses and other heavy motor vehicles.

The object of my invention is to provide a device of the character indicated that enables the operator of the vehicle to apply the brakes in substantially the same manner as a foot operated brake is applied so that just the right amount of braking effect is obtained. It is well known that one objection to the use of fluid pressure brakes on motor vehicles is the tendency of such brakes to grab too hard when pressure is applied and also the fact that the average operator will tend to release the pressure too suddenly thereby resulting in an uneven braking of the vehicle and discomfort to the passengers. By the use of my device it is possible for the operator to apply the brakes with just the right amount of pressure which can be either maintained or gradually decreased or increased, as desired, so that the vehicle comes to rest smoothly. The above and other advantageous features of my invention will hereinafter more fully appear, reference being had to the accompanying drawings in which,—

Fig. 1 is a view in side elevation showing my device mounted on the footboard of a motor vehicle.

Fig. 2 is a view in front elevation of the parts shown in Fig. 1.

Like reference characters refer to like parts in the different figures.

Figure 3:
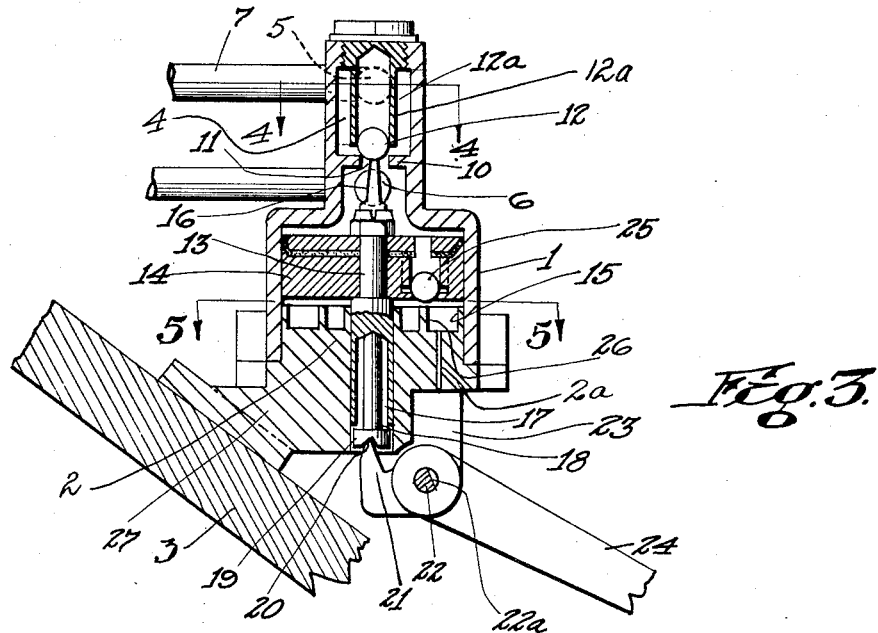
Fig. 3 is a sectional view along the line 3, 3 of Fig. 2.
Figure 5:
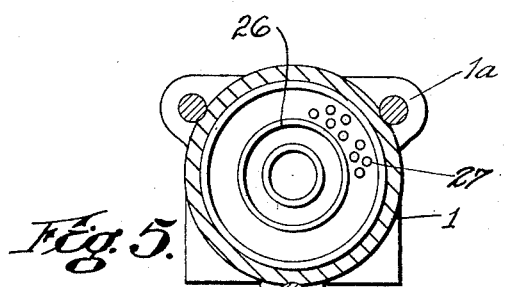
Fig. 5 is a horizontal sectional view along the line 5, 5 of Fig. 3.
Figure 4:
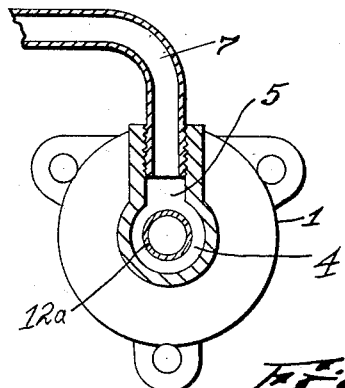
Fig. 4 is a horizontal sectional view along the line 4, 4 of Fig. 3.

Referring first to Fig. 1, my device consists of a cylindrical casing 1 secured by bolts 1a to a base 2 providing a bracket portion 2a by means of which the base may be secured to the footboard 3 of a motor vehicle. The upper portion of the casing 1 provides a valve chamber 4 providing openings 5 and 6 for receiving pipes 7 and 8 respectively. The pipe 7 is connected to a suitable source of fluid pressure, not shown, such as an air or oil pump while the pipe 8 leads to a suitable pressure responsive device, such as a cylinder 9, for applying the brakes of the vehicle when fluid under pressure is admitted to the cylinder 9 through the pipe 8.

As best shown in Fig. 3, the valve chamber 4 is separated in two parts by a partition 10, which partition 10 provides a port 11 normally closed by a ball 12 seated by gravity in the port 11. With the ball 12 thus seated it is apparent that fluid under pressure admitted through the pipe 7 will not be able to pass to the lower part of the chamber into the opening 6 from which leads the pipe 8 to the brake cylinder 9.

A valve operating spindle 13 extends through the casing 1 and has attached thereto a piston 14 which fits closely within the bore 15 of the casing 1. The upper portion of the spindle 13 provides a reduced portion 16 which is adapted to enter the valve port 11 when the spindle is lifted while the lower end of the spindle 13 provides an axial recess 17 in which is received a lifting pin 18. The lower end of the pin 18 terminates in an enlarged head 19 providing a notch 20 in which is received the beveled end of an operating lever 21. The lever 21 is mounted on a shaft 22 supported in lugs 23 extending downwardly from the base 2, as shown in Fig. 2, and the lever 21 has formed integral therewith a treadle portion 24 extending above the footboard 3 and spaced therefrom. The shaft 22 provides a knife edge 22a on which the combined lever 21 and treadle 24 pivots freely.

Normally the piston 14 maintains the spindle 13 in such a position within the bore 15 that the upper end of the reduced portion 16 of the spindle 13 terminates just below the valve 12, as seated in the port 11. However, when the foot treadle 24 is depressed, turning of the lever 21 on the shaft 22, in a clockwise direction, in Fig. 3, causes the spindle 13 to be thrust upwardly thereby lifting the ball 12 from the port 11, within a surrounding sleeve 12a. When this occurs fluid under pressure is admitted to the opening 6 and the pipe 8 through which pressure is transmitted to the brake cylinder 9, thereby applying the brakes of the vehicle. Lifting of the spindle 13 by the lever 21 is accomplished substantially without friction owing to the provision of the loose pin 18 within the lower end of the spindle 13 and the fact that the operating end of the lever 21 provides what amounts to a knife edge. The pivotal mounting of the lever 21 on the knife edge 22a is similar to the support of a scale balance and renders the movement of the spindle 13 very sensitive in response to movements of the foot treadle 24.

When fluid under pressure is admitted through the port 11 by lifting of the ball valve 12, pressure is also exerted on the top of the piston 14 carried by the spindle 13. This pressure tends to move the piston downwardly within the casing 1, the pressure working against the upward thrust on the spindle 13 caused by the pressure of the operator's foot. However, should the operator relieve the foot pressure but slightly, as is the natural tendency following application of the brakes, the piston 14 will move downwardly and permit the ball valve 12 to approach its seat 11. Assuming that operation of the foot treadle 24 has caused enough pressure to be applied by the brakes, the natural release of the foot treadle 24 by the operator automatically results in shutting off the pressure when continued downward movement of the spindle 13 permits the ball 12 to again seat in the port 11. Since the ball 12 tends to seat in the port 11 by gravity, the downward pressure of the fluid exerted on the ball itself adds to the force of gravity and causes the ball to quickly and tightly close the port 11 as soon as downward movement of the spindle portion 16 releases the ball 12.

Figure 6:
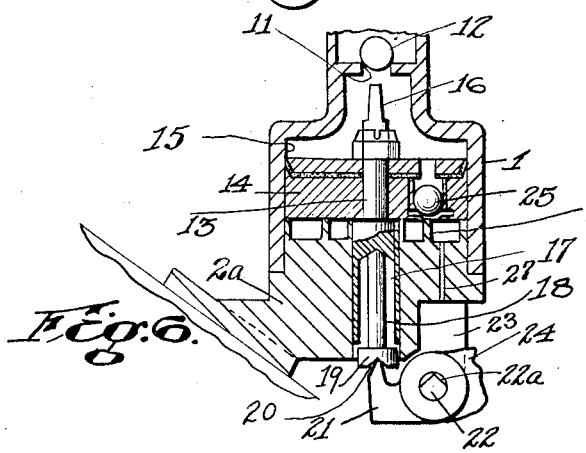
Fig. 6 is a fragmentary sectional view showing the parts of Fig. 3 in a different position.
Figure 7:
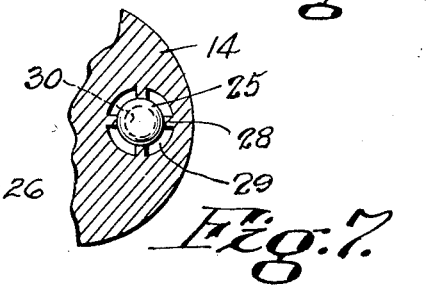
Fig. 7 is a fragmentary horizontal sectional view through the middle of the exhaust valve 25.

It is evident that a given pressure in the brake cylinder 9 will be maintained following the reseating of the valve 12 so that the brakes of the vehicle will remain applied with the initial amount of pressure. When it is desired to release the brakes, the operator naturally releases the foot treadle 24 entirely, whereupon the pressure acting on the piston 14 moves the spindle further downwardly to cause a ball valve 25 carried by the piston 14 to be lifted when it engages an annular projection 26 extending upwardly from the base 2 on which the casing 1 is mounted. That portion of the base 2 below the ring 26 provides a number of perforations 27 so that when the ball valve 25 is lifted by its engagement with the ring 26, the pressure acting on the piston 14 and in the brake cylinder 9 will be immediately exhausted. The position occupied by the piston 14 at the moment of pressure release is clearly shown in Fig. 6, the downward movement of the piston 14 being limited by its engagement with the base 2. As best shown in Fig. 7, the ball valve 25 is vertically movable between guiding ribs 28 projecting outwardly from an opening 29 in the piston 14 above the seat 30 for the ball 25, the pressure medium passing between the ribs 28 to the exhaust passages 27 when the ball 25 is lifted by its engagement with the ring 26.

From the foregoing, it is apparent that by my invention I have provided a device for effectively controlling the application of the brakes of a motor vehicle by a fluid pressure medium. My device is particularly characterized by the fact that when the foot treadle 24 is operated to apply pressure, the resulting braking effect can be maintained without increase or decrease by merely permitting the foot treadle to release very slightly when the brakes start to take hold. In other words, application of the brakes of the vehicle is followed by the tendency to automatically shut off the brake cylinder from the pressure source, as soon as the desired maximum braking effect has been attained. This easing off of the pressure automatically follows, whether or not the operator consciously releases the treadle 24, for the pressure acting on the piston 14 starts to move the spindle 13 as soon as pressure is applied. The speed with which the brakes are released is also adapted to be controlled very sensitively dependent on how quickly the ball valve 25 is raised by engagement with the ring 26. In other words, the braking effect on the vehicle is always very closely under the control of the operator with his foot on the treadle 24, the very slightest movement of the treadle 24 resulting in either an increase or decrease of the braking effect. The application of the brakes of a motor vehicle equipped with my device, very closely approximates the manner of applying the ordinary foot brake and there is never any tendency for the brakes to be applied very suddenly, or released suddenly, as might well be the case with ordinary control valves, without any automatic compensating feature, such as is represented by the piston 14 controlling the spindle 13. My device employs no springs, diaphragms or other delicate parts liable to get out of adjustment and can be very quickly taken apart by merely removing the bolts 28 which secure the casing 1 to the base 2. The fact that the axis of the spindle 13 passes through the center of the ball valve 12 and through the lifting pin 18 insures that the device will operate substantially without friction in response to the slightest movement of the treadle 24.

I claim:

1. In a device of the class described, the combination with a source of fluid pressure and pressure responsive means adapted to be operated from said pressure source, of a control device comprising a gravity seated valve interposed between said pressure source and said pressure responsive means, a spindle for operating said valve, a movable foot treadle for moving said spindle to lift open said valve and a piston carried by said valve spindle adapted to receive the pressure for operating the pressure responsive means when said valve is opened, whereby to exert a force tending to move said spindle downwardly against the opening pressure exerted by said foot treadle and thereby permit closing of said valve, continued movement of said piston also automatically opening a second gravity seated valve carried by said piston for releasing the pressure applied to said pressure responsive means.

2. In a device of the class described, the combination with a source of fluid pressure, pressure responsive means adapted to be operated from said pressure source and a cylinder providing chambers connected to said pressure source and said pressure responsive means respectively, with a partition providing a port between said chambers, of a valve located in said pressure chamber adapted to be held seated in said port by the combined force of gravity and said fluid pressure, a spindle for operating said valve, a pivoted foot treadle for moving said spindle upwardly to lift open said valve, a piston carried by said valve spindle within the chamber connected to the said pressure responsive means adapted to exert a force tending to move said spindle downwardly against the pressure exerted by said foot treadle to open said valve and a second gravity seated valve carried by said piston adapted to be lifted open when downward movement of said piston permits the first-named valve to close, whereby to exhaust the pressure applied to said pressure responsive means.

NATHANIEL LOMBARD.